Sept. 19, 1961   W. J. SONNENBURG ET AL   3,000,541
METER MINDER

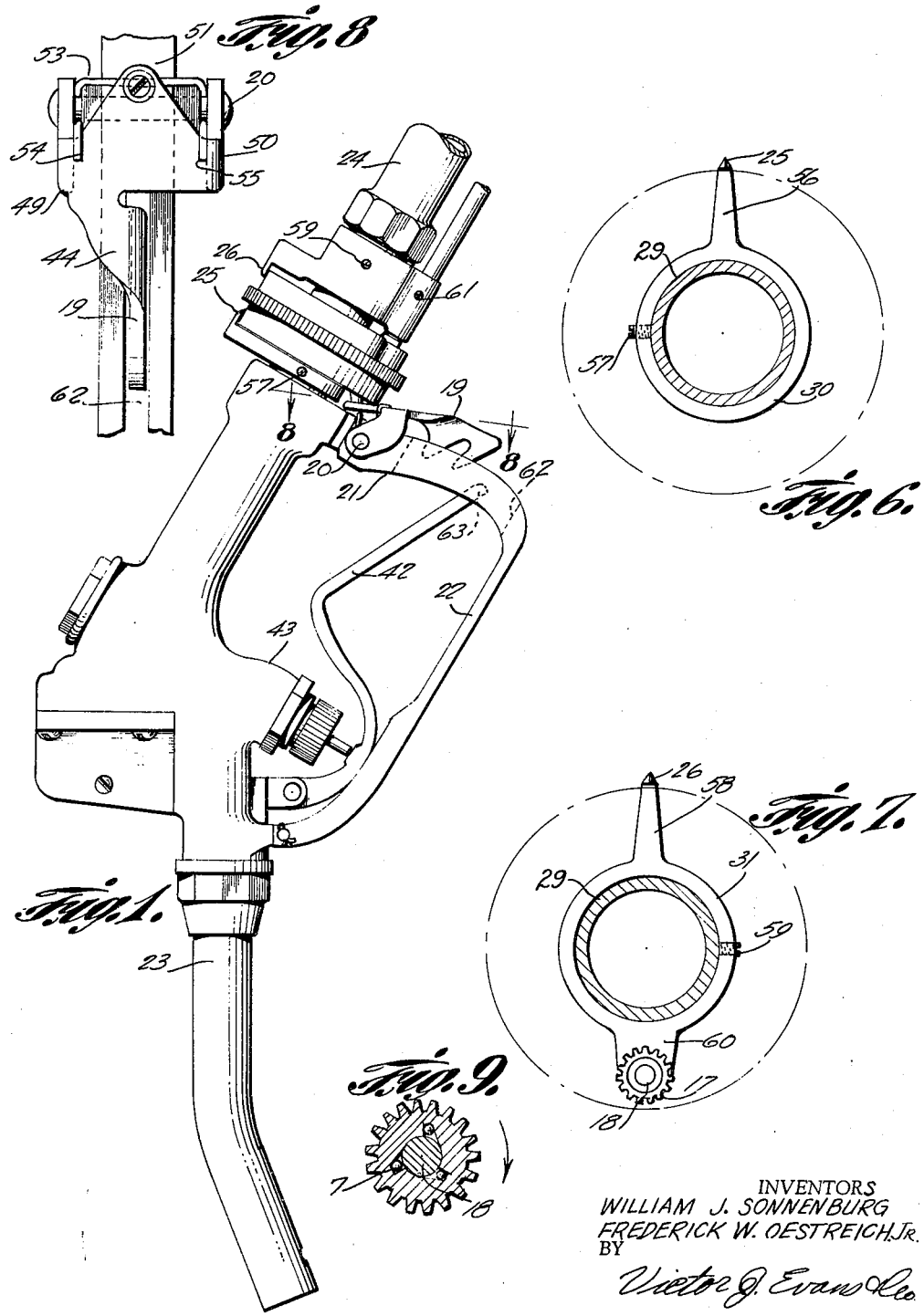

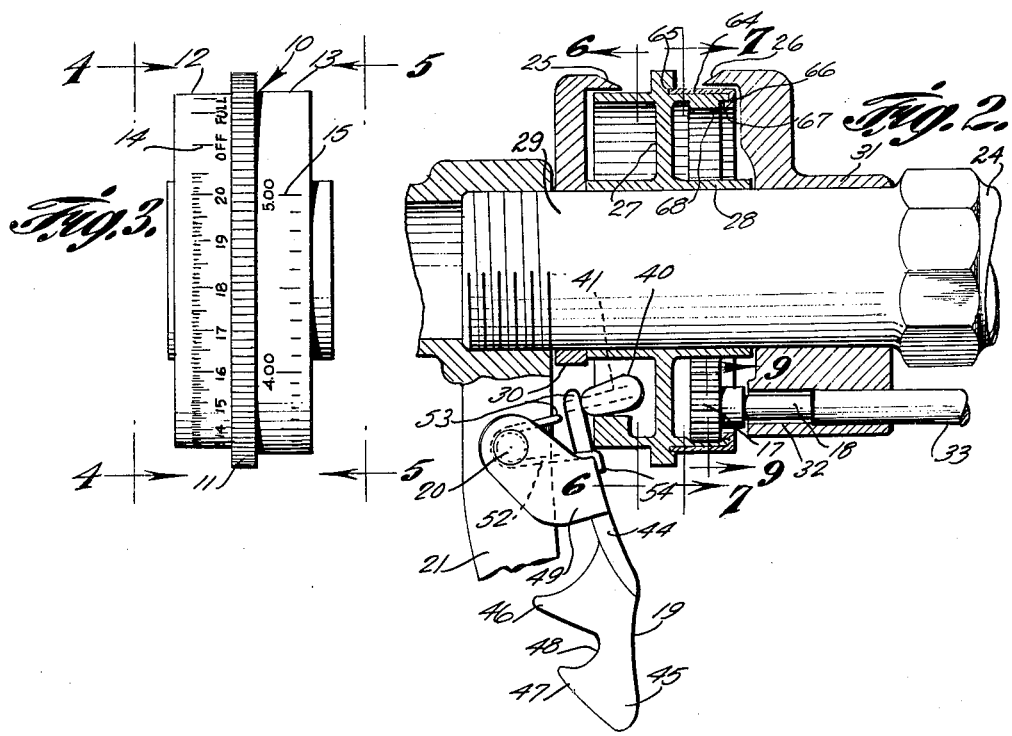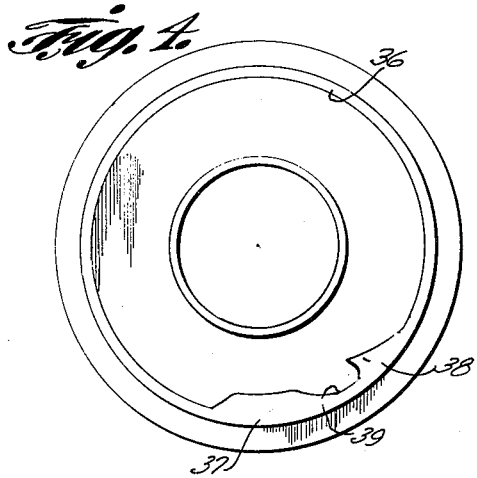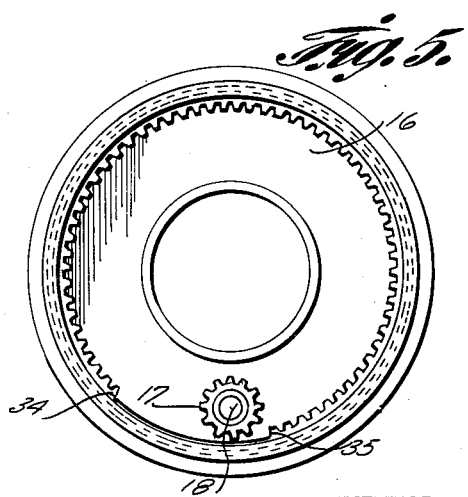

Filed July 29, 1959   3 Sheets-Sheet 3

INVENTORS
WILLIAM J. SONNENBURG
FREDERICK W. OESTEREICH, JR.

Victor J. Evans & Co.
ATTORNEYS

United States Patent Office 3,000,541
Patented Sept. 19, 1961

3,000,541
METER MINDER
William J. Sonnenburg, 2038 W. Hill Ave., Fullerton, Calif., and Frederick W. Oestreich, Jr., 9546 Melita St., Pico Rivera, Calif.
Filed July 29, 1959, Ser. No. 830,219
4 Claims. (Cl. 222—20)

This invention relates to fluid dispensing devices, and in paritcular means for automatically operating a valve to stop the flow of fluid through a body after a predetermined amount of fluid is dispensed.

The object of this invention is to provide an attachment for a fluid dispensing instrument on which the quantity of fluid and the value of the fluid dispensed by the instrument is indicated.

Another object of the invention is to provide an attachment for fluid dispensing instruments or heads in which the attachment may be installed on instruments now in use.

With these and other objects and advantages in view the invention embodies a fluid dispenser having an automatic shut-off for use in filling tank cars, ships, aircraft, missiles, and also for use at neighborhood filling stations, and the like from such containers as under ground tanks, above ground tanks, pipelines, barges, flying tankers, and the like.

Other features and advantages of the invention will appear from the following description taken in connection with the drawings, wherein:

FIGURE 1 is a side elevational view showing a dispensing instrument, such as the gun or nozzle at the end of a hose of a fuel pump of a filling station illustrating the fuel indicating and automatic control attachment positioned between the hose and a handle of the nozzle.

FIGURE 2 is a longitudinal section through the attachment showing the parts positioned on a mounting sleeve inserted between the hose of a fluid dispensing pump and the handle of the nozzle, at the end of the hose.

FIGURE 3 is a side elevational view of a collar having quantity and value scales on opposite ends thereof positioned on the mounting sleeve.

FIGURE 4 is an end elevational view looking toward the end of the collar in which a cam for controlling the valve operating lever is positioned, the view being taken on line 4—4 of FIGURE 3.

FIGURE 5 is an end elevational view of the collar taken on line 5—5 of FIGURE 3 showing the gears for actuating the collar.

FIGURE 6 is an elevational view of the quantity indicating pointer taken on line 6—6 of FIGURE 2 with other parts omitted.

FIGURE 7 is a view taken on line 7—7 of FIGURE 2 showing the mounting of the pointer for indicating the value of a quantity of fluid and also showing the pinion for rotating the collar.

FIGURE 8 is a section taken on line 8—8 of FIGURE 1 showing the mounting of the trigger for controlling the valve operating lever and with parts broken away.

FIGURE 9 is a section taken on line 9—9 of FIGURE 2 illustrating an over-riding clutch assembly positioned in a pinion for actuating a collar upon which gallons and values of quantities of fluid are positioned.

Figure 10:
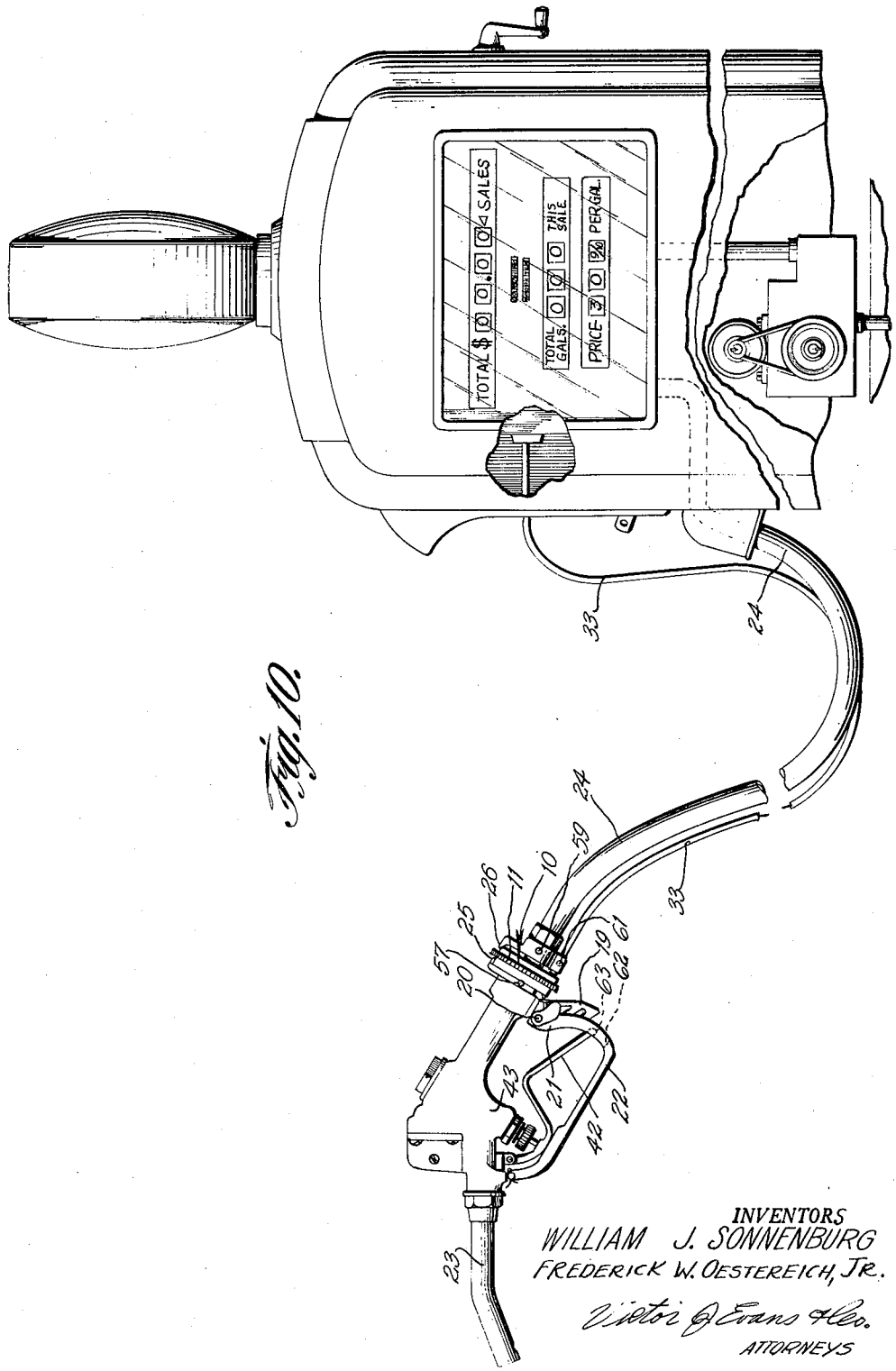
FIGURE 10 is an enlarged elevational view showing the manner of operatively connecting the embodiment of the invention to a fluid dispensing device, certain parts being broken away to more clearly disclose the various parts of the fluid dispensing device.

This invention includes a collar 10 having a knurled center rim 11 by which the collar is grasped by the thumb and forefinger of a hand of an operator to turn the collar to predetermined positions.

The rim divides the collar into end sections 12 and 13 with a scale for quantities, such as gallons, as indicated by the numeral 14 on the end 12 and a removable scale 15 in dollars and cents on the end 13. The collar 10 is provided wtih an internal gear 16 in the end 13. A pinion 17 with an overriding clutch 7 is mounted on a flexible shaft 18 and positioned to mesh with the gear 16 when the collar 10 is positioned for predetermined delivery, and to rotate freely in a slot from point 34 to point 35 when a full tank is desired. A trigger 19 is pivotally mounted by a pin 20 on a section 21 of a guard 22 of a nozzle or gun 23 of a fuel pump hose 24. A pointer 25 is positioned to register with the scale 14 on the end 12 of the collar, and a pointer 26 is mounted to register with the scale 15 on the end 13 of the collar.

As illustrated in FIGURE 2 the collar 10 is carried by an annular web 27 extended from a hub 28 which is rotatably mounted on a mounting sleeve 29. The pointer 25 is mounted on the sleeve 29 by a ring 30 and the pointer 26 extends from a hub 31 also positioned on the sleeve 29. The hub 31 is provided with an extension having a bearing 32 therein in which the outer end of the flexible shaft is mounted. The flexible shaft 18 is enclosed in a sheath 33 that extends from the pump meter to the nozzle, and it will be understood that the flexible shaft may also be run through the hose 24.

The gear 16 is provided with a gap extended from the point 34 to the point 35 wherein the pinion 17 is free to rotate when the collar 10 has been turned to the "full" position.

The end 12 of the collar 10 is provided with a wall 36 and the wall is provided with a cam 37 for pre-set shutoff and a cam 38 for overriding or panic shutoff. The cams are separated by a recess 39 for full tank shutoff by nozzle vacuum release and these surfaces are positioned to engage a roller 40 mounted by a pin 41 on the upper end of the trigger 19, whereby upon engagement of the cams 37 and 38 with the roller the trigger 19 is actuated to release the valve operating lever 42 whereby the valve 43 is closed.

The trigger 19 includes a plate 44 from which a latch 45, including prongs 46 and 47, separated by a recess 48, extends and the upper part of the plate is provided with arms 49 and 50 through which the pin 20 extends whereby the arms 49 and 50 straddle the portion 21 of the handle guard 22.

The upper end of the plate 44 is provided with a projection 51 in which the pin 41 on which the roller 40 is mounted is secured.

The trigger is also provided with a spring 52 that extends around the pin 20, the intermediate part 53 of the spring extending over the portion 21 of the handle guard 22 and the ends 54 and 55 over the upper portion of the plate 44.

The pointer 25 is carried by a finger 56 extended from a ring 30 and the ring 30 is secured in position on the tube 29 by a set screw 57. The pointer 26, which is carried by a finger 58, extended from the hub 31, is secured in position by a set screw 59 and the hub 31 is provided with an extension 60 in which the bearing 32 of the shaft 18 is mounted. The flexible shaft or sheath 33 is also secured in the extension of the hub 31 by a set screw 61.

The end portion 21 of the handle guard 22 is bifurcated providing a slot 62 into which the tip 63 of the lever 42 extends and as the valve operating lever 42 is drawn upwardly to open the valve 43 the tip 63 snaps into the recess 48 of the trigger 19 retaining the lever with the valve in the open position.

As illustrated in FIGURE 2 the surface of the end 13 of the collar 10 is covered by a semi-circular cover 64, which is provided for price changes and which is easily removed and replaced. The inner edge of the cover 64 extends into an annular slot 65 in the rim 11 and the outer edge is provided with a flange 66 on the edge of which is a lip 67 that extends into a notch 68 at the edge of the gear 16.

With the parts assembled as illustrated and described the valve operating lever 42 is drawn upwardly until the tip 63 extends into one of the recesses or notches 48 of the trigger 19 whereby the lever 42 is retained in the position of holding the valve 43 open, and with fuel flowing through the nozzle 23, the pinion 17, meshing with the gear 16, rotates the collar 10 until the roller 40 engages the cam projection 37. In this movement the valve operating lever 42 is released. The dispensing valve of the nozzle may be opened and closed in the conventional manner when roller 40 is positioned on cam projection 37. When collar 10 is rotated to permit roller 40 to drop into recess 39, valve 43 is locked open, allowing vacuum release feature of the valve to function in normay fashion while pinion 17 rotates freely in the slot from point 34 to point 35 or until collar 10 is rotated by the hand of the operator until cam 38 passes under roller 40.

In the operation of the attachment, the collar 10 is rotated by the pinion gear 17 until the desired quantity of fluid is in registering relation with the pointer 25, or wherein the value of the material desired is in registering relation with the pointer 26, and in turning the collar 10 to obtain registration of the pointers with the fluid the gear 16 rotates around the pinion 17 whereby the cam 37 and roller 40 are moved to positions whereby the pinion 17 rolls into the gap of the gear 16 when the desired amount of fluid has passed through the nozzle or valve assembly.

The over-riding clutch 7 in the pinion 17 permits the collar 10 to be rotated freely to set the meter to predetermined position, depending upon the number of gallons or the value of a supply of fuel desired.

In addition to being used at filling stations the meter minder of this invention may also be used for filling tank cars, ships, aircrafts, missiles, and the like, and the fluid may be taken from such containers as underground tanks, above ground tanks, pipelines, barges flying tankers, and the like.

It will be understood that modifications, within the scope of the appended claims, may be made in the design and arrangement of the parts without departing from the spirit of the invention.

What is claimed is:

1. An attachment for a fuel pump hose dispensing valve having a pump meter, a lever for operating the valve and a trigger for controlling the lever, the improvement comprising a collar having scales on end portions thereof rotatably mounted on the hose adjacent the valve, hubs mounted on the hose at opposite ends of said collar, pointers mounted on the hubs to register with the scales of the collar, said collar having an internal gear therein, a pinion meshing with the internal gear of the collar and mounted on a flexible shaft extended from the pump meter for rotating the collar with rotation of the pump meter, and means for actuating the trigger to release the valve operating lever to close the valve when the collar rotates to a predetermined position.

2. In a metering attachment for a valve of a nozzle of a fluid dispenser, the combination which comprises a collar having a knurled rim with scales on end sections thereof rotatably mounted on the dispenser, hubs mounted on the dispenser at opposite sides of said collar, pointers integral with the hubs and positioned to coact with the scales of the collar, said collar having an internal gear with a gap therein in one end thereof, a pinion mounted to mesh with the internal gear of the collar, a flexible shaft for connecting the pinion to a fluid supply pump, a trigger pivotally mounted on the nozzle and positioned to coact with an operating lever of the valve of the nozzle for retaining the valve in the open position, and means for actuating the trigger to release the lever when a predetermined quantity of fluid has passed through the nozzle.

3. In an attachment for a fluid pump hose nozzle having a valve with an operating lever therefor therein, the valve operating lever being positioned in the handle of the valve, a collar having scales on outer surfaces of ends thereof rotatably mounted on the nozzle adjacent the handle of the valve, hubs mounted on the nozzle adjacent the opposite sides of said collar, pointers integral with said hubs and positioned to register with scales of the collar, said collar having an internal gear with a gap therein on the inside of one end thereof, a pinion positioned to mesh with the internal gear of the collar, a flexible shaft on which the pinion is mounted, the flexible shaft being extended from a fluid supply pump, a trigger pivotally mounted on the handle of the nozzle and having notches therein positioned to receive the tip of the operating lever of the valve for retaining the lever whereby the valve is in the open position, the collar having a cam therein, and a roller mounted on the trigger and positioned to be engaged by the cam of the collar for actuating the trigger to release the valve operating lever.

4. In a metering dispensing head, the combination which comprises a valve in the dispensing head, a handle extended from the valve for manually actuating the valve, a supply pump, a hose connecting the supply pump to the dispensing head, a mounting sleeve positioned between the hose and the dispensing head, a collar having graduations on opposite edges thereof rotatably mounted on the mounting sleeve, a flexible shaft extended from the supply pump to the collar, means operatively connecting the flexible shaft to the supply pump, means operatively connecting the flexible shaft to the collar for rotating the collar as the supply pump operates, trip means for retaining the operating lever of the valve of the dispensing head in the open position, and means actuating the trip means for releasing the lever and closing the valve of the dispensing head when a predetermined quantity of fluid is dispensed.

References Cited in the file of this patent

UNITED STATES PATENTS

| 74,605 | Saunders | Feb. 18, 1868 |
| 867,587 | Moore | Oct. 8, 1907 |
| 2,224,540 | Fraser | Dec. 10, 1940 |
| 2,557,336 | Buchanan | June 19, 1951 |
| 2,804,991 | Burleyson | Sept. 3, 1957 |
| 2,955,725 | Niederst | Oct. 11, 1960 |